United States Patent [19]

Hake

[11] Patent Number: 4,812,088

[45] Date of Patent: Mar. 14, 1989

[54] DOWELING TOOL

[75] Inventor: Leon M. Hake, Perry, Okla.

[73] Assignee: Wittwer Construction Co., Inc., Stillwater, Okla.

[21] Appl. No.: 6,726

[22] Filed: Jan. 23, 1987

[51] Int. Cl.[4] .............................................. B23B 45/04

[52] U.S. Cl. .................................. 408/130; 173/152; 384/58

[58] Field of Search .................. 408/42, 130; 173/152; 175/62; 384/53, 58

[56] References Cited

U.S. PATENT DOCUMENTS

| | | | |
|---|---|---|---|
| 2,638,387 | 5/1953 | Bech | 384/58 X |
| 2,895,715 | 7/1959 | Stenuick | 408/130 X |
| 2,976,942 | 3/1961 | Pitcher | 408/130 X |
| 3,160,074 | 12/1964 | Leander et al. | 173/152 X |
| 4,215,958 | 8/1980 | Jägers | 408/42 X |
| 4,375,195 | 3/1983 | Tsuboi | 384/58 X |
| 4,553,612 | 11/1985 | Durham | 173/152 X |

OTHER PUBLICATIONS

A copy of an undated brochure from Tamrock Tool, Inc.

*Primary Examiner*—John McQuade
*Assistant Examiner*—Steven C. Bishop
*Attorney, Agent, or Firm*—Dunlap, Codding & Peterson

[57] ABSTRACT

A doweling tool for drilling a dowel hole in concrete to facilitate the insertion of dowels, the doweling tool having a guide bar, a support frame for supporting the guide bar, a carriage movingly connected to the guide bar, a pneumatically operated drilling tool having a drill bit connected to the carriage and a pneumatic cylinder having a portion connected to the support frame and another portion connected to the carriage. The pneumatic cylinder is operable to move the carriage and the drilling tool connected thereto in a forward direction for drilling the dowel hole and for moving the carriage and the drilling tool connected thereto in a reverse direction for withdrawing the drilling tool from the dowel hole. The carriage is rollingly supported on the guide bar by a roller assemblies for rolling movement in the forward and reverse direction.

10 Claims, 4 Drawing Sheets

DOWELING TOOL

BACKGROUND OF THE INVENTION

Field of the Invention

The present invention relates generally to doweling tools and, more particularly, but not by way of limitation, to a doweling tool having a pneumatically operated drilling tool supported on a carriage wherein the carriage is rollingly supported on a guide bar and a pneumatic cylinder operates to move the carriage in forward and reverse directions.

BRIEF DESCRIPTIONS OF THE DRAWINGS

BRIEF DESCRIPTION OF THE PREFERRED EMBODIMENT

Figure 1:
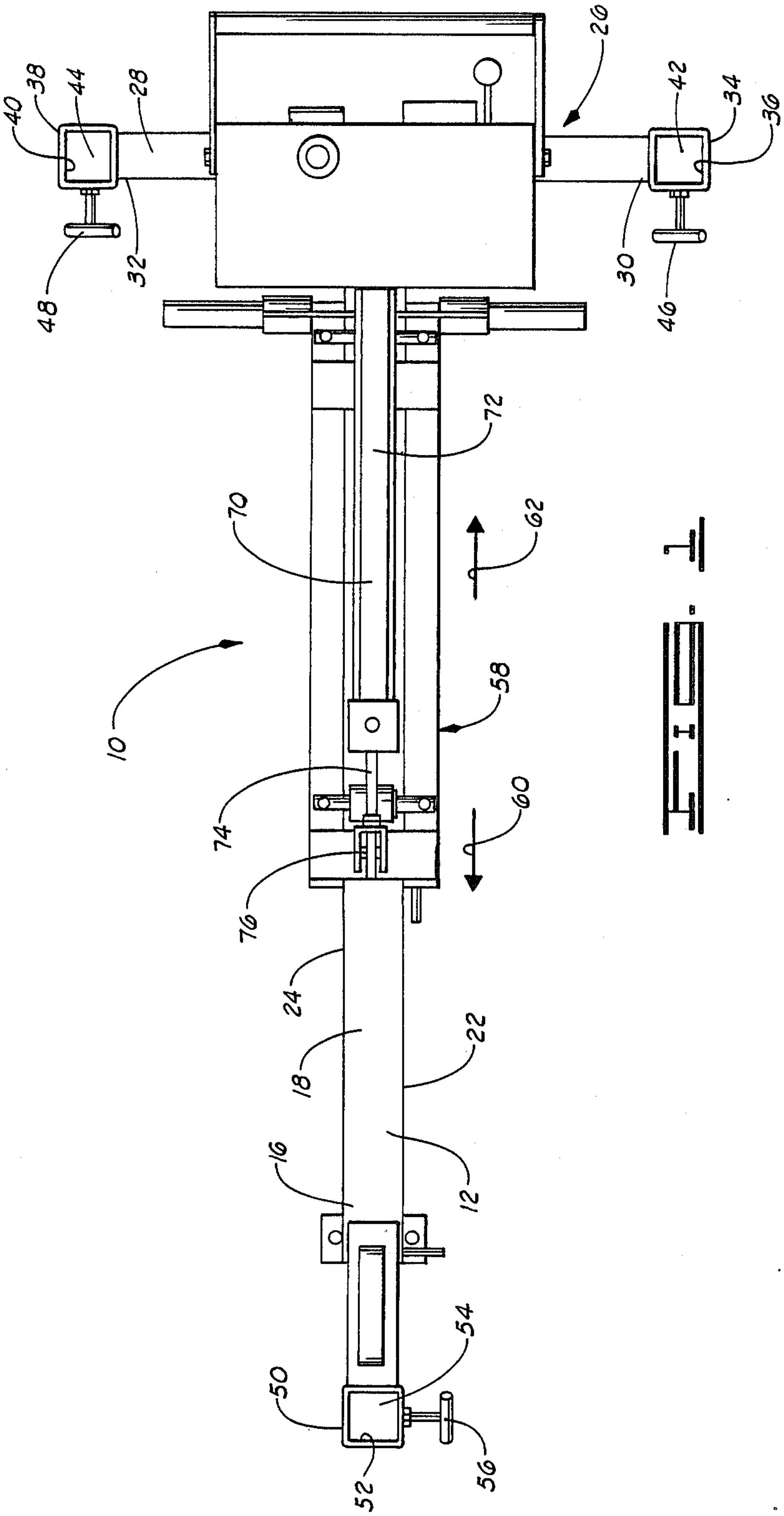
FIG. 1 is a top elevational view of a doweling tool constructed in accordance with the present invention.
Figure 2:
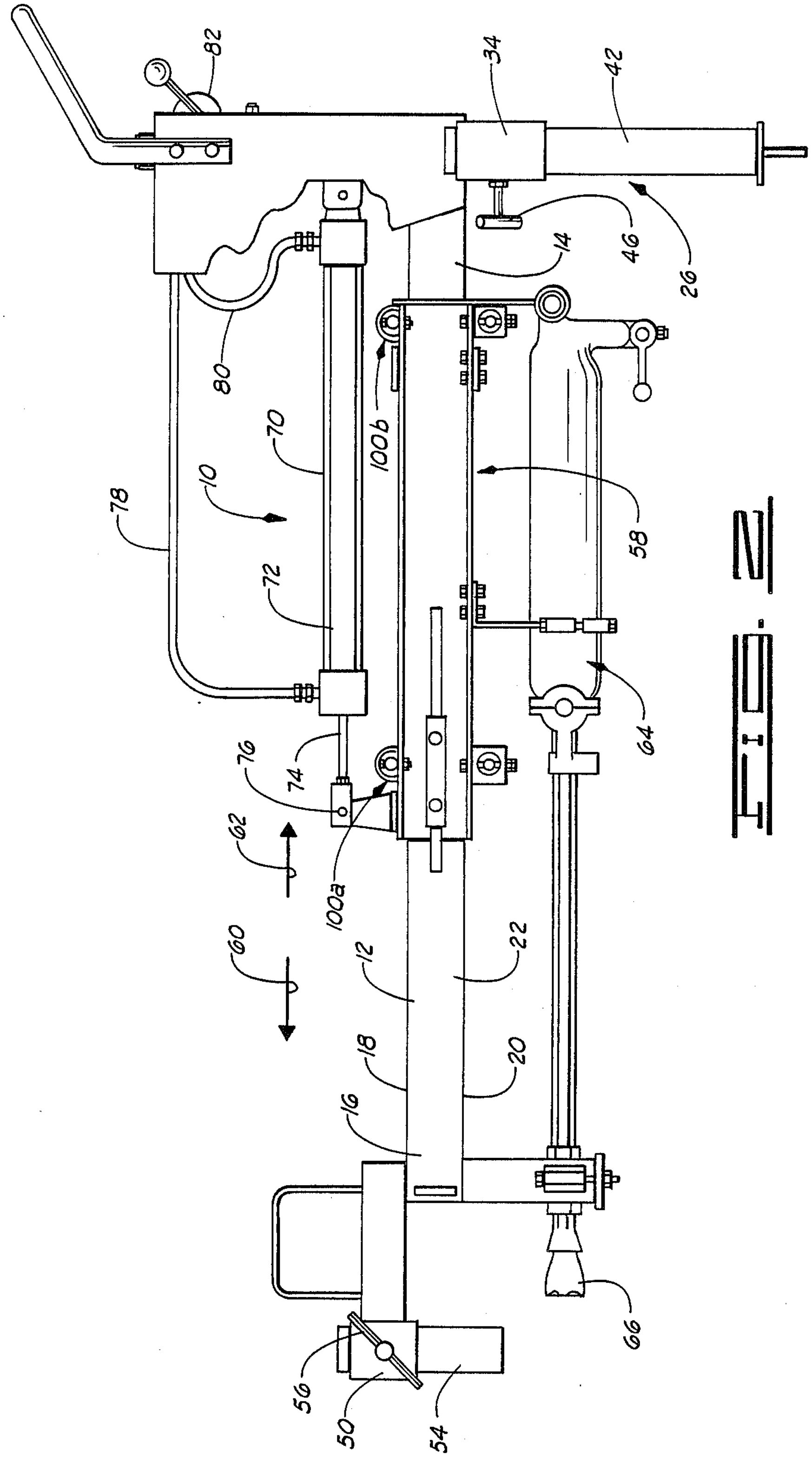
FIG. 2 is a side elevational view of the doweling tool of FIG. 1.
Figure 3:
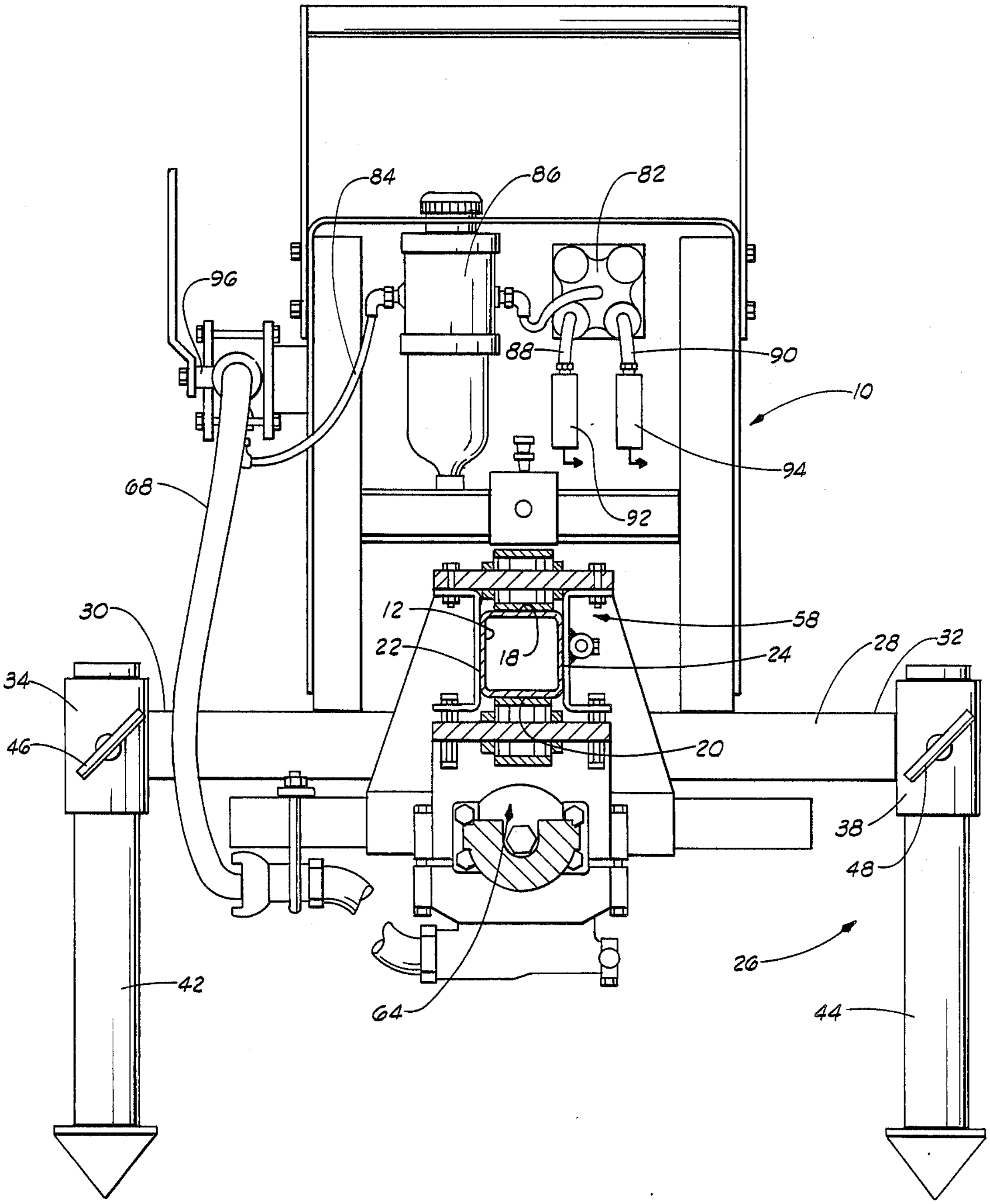
FIG. 3 is an end elevational view, partial sectional view of the doweling tool of FIGS. 1 and 2.

Shown in FIGS. 1, 2 and 3 is a dowelling tool 10 which is constructed in accordance with the present invention. The doweling tool 10 is adapted for drilling a dowel hole in concrete to facilitate the insertion of a dowel in the dowel hole. When placing one slab of concrete adjacent an already formed slab of concrete, dowel holes are drilled in the edge of the already formed slab and a dowel are affixed in each of the dowel holes with a portion of each dowel extending a distance from the edge of the concrete. Thus, when the adjacent slab of concrete is poured, a portion of the adjacent slab in compasses the portion of the dowels extending from the edge of the already formed slab of concrete so that a portion of each of the dowels extends into the already formed slab of concrete and another portion of the dowels extends into the adjacent edge of the newly formed concrete slab. The dowels cooperate to maintain the adjoining edges of slabs of concrete generally aligned. The use of dowels and the forming of dowel holes to accommodate dowels in the manner just described are well known in the art and a detailed description of such operations and uses is not deemed necessary herein.

The doweling tool 10 includes a guide bar 12 having a first end 14 (shown in FIG. 2) a second end 16 (shown in FIGS. 1 and 2) an upper surface 18 a lower surface 20 a first side 22 and a second side 24. Although the guide bar 12 has been specifically shown in FIGS. 1, 2 and 3 as being a bar having a generally square shape cross-section, it should be noted that the guide bar 12 could be circularly shaped so that the first and second ends, the upper and lower surfaces and the first and the second sides each are arcuate sections of the guide bar having the circularly shaped cross-section.

A support frame 26 is connected to the guide bar 12 for supporting the guide bar 12 in an operating position. More particularly, the support frame 26 includes a support bar 28 having opposite ends 30 and 32, the first end 14 of the guide bar 12 being secured to a mid portion of the support bar 28 generally between the opposite ends 32 and 34. A first channel 34 is connected to the end 30 of the support bar 28 and the first channel 34 has a square shaped opening 36 extending therethough. A second channel 38 is connected to the opposite end 32 of the support bar 28 and the second channel 38 has a square shaped opening 40 extending therethrough.

A first leg 42 extends through the opening 36 in the first channel 34 and a second leg extends through the opening 40 in the second channel 38. A lock pin 46 extends through the first channel 34 intersecting the opening 36, a portion of the locked pin 46 engaging the first leg 42 to secure the first leg 42 in a predetermined position within the opening 36 in the first channel 34. A lock pin 48 extends through the second channel 38 and a portion of the lock pin 48 extends into the opening 40 in the second channel 38 to engage the second leg 44 and to secure the second leg 44 in a predetermined position within the opening 40 in the second channel 38.

A third channel 50 is connected to the second end 16 of the guide bar 12 and the third channel 50 has a square shaped opening 52 extending therethrough. A third leg 54 extends through the opening 52 in the third channel 50. A lock pin 56 extends through the third channel 50 and a portion of the lock pin 56 intersects the opening 52 in the third channel 50 and engages the third leg 54 to secure the third leg 54 in a predetermine position within the opening 52 in the third channel 50.

It should be noted that the guide bar 12 also constitutes a portion of the support frame 26 since the guide bar 12 also functions and cooperates with the support bar 28 and the legs 42, 44 and 54 to support the guide bar 12 in the operating position.

A carriage 58 is movingly connected to the guide bar 12 for sliding movement in a forward direction 60 generally from the first end 14 toward the second end 16 of the guide bar 12 and for movement in a reverse direction 62 generally from the second end 16 toward the first end 14 of the guide bar 12.

A pneumatically operated drilling tool 64 is connected to the carriage 58. The drilling tool 64 has a drill bit 66 connected to one portion thereof. The drilling tool 64 is adapted to receive operating air and the drilling tool 64 has an operating condition wherein the drilling tool 64 drivingly rotates the drill bit 66 when receiving operating air for drilling the dowel hole in the concrete. Pneumatically operated drilling tools which function and operate in the manner just describe in connection with the drilling tool 64 are commercially available from such sources as American Pneumatic Tool of Gardena, Calif., one such drilling tool suitable for operating in the manner described herein with respect to the drilling tool 64 is designated by the American Pneumatic Tool, Model No. 155.

The drilling tool 64 has an air inlet for receiving operating air by way of a conduit 68 (shown in FIG. 3). The drilling tool 64 has an operating condition and the drilling tool 64 is conditioned in the operating condition when receiving operating air by way of the conduit 68. When the drilling tool 64 is in the operating condition receiving operating air by way of the conduit 68, the drilling tool 64 operates to drivingly rotate the drill bit 66 for drilling the dowel hole in the concrete. The drilling tool 64 also includes an air exhaust (not shown in the drawings) for exhausting the operating air received by way of the conduit 68 in a manner well known in the art.

The doweling tool 10 also includes a pneumatic cylinder 70 having a cylinder base 72 and a cylinder rod 74 extending a distance from the cylinder base 72. The cylinder base 72 is connected to the support frame 26 and, more particularly, the cylinder base 72 is connected to the support bar 28 generally near the first end 14 of the guide bar 12. It should be noted that the cylinder base 72 also could be connected to the first end 14 portion of the guide bar 12 if desired in a particular application and this is one of the reason the guide bar 12 has been defined earlier as constituting part of the support frame 26. The outer most end of the cylinder rod 74 is connected to the carriage 58 by way of a connection 76.

The pneumatic cylinder 70 is adapted to receive operating air by way of a conduit 78 (shown in FIG. 2) at a forward end of the pneumatic cylinder 70 and the pneumatic cylinder 70 is adapted to receive operating air by way of a conduit air 80 (shown in FIG. 2) generally at a rearward end of the pneumatic cylinder 70. The pneumatic cylinder 70 has a forward condition and the pneumatic cylinder 70 is condition in the forward condition when receiving operating air by way of the conduit 80. The pneumatic cylinder 70 also has a reverse condition and the pneumatic cylinder 70 is conditioned in the reverse condition when receiving operating air by way of the conduit 78. When the pneumatic cylinder 70 is receiving operating air by way of the conduit 78, the pneumatic cylinder 70 is condition in the reverse condition for moving the cylinder rod 74 in the reverse direction 62. When the pneumatic cylinder 70 is receiving air by way of the conduit 80, the pneumatic cylinder 70 is conditioned in the forward condition for moving the cylinder rod 74 in the forward direction 60.

The conduits 78 and 80 each are connected to a control valve 82 (shown more clearly in FIG. 3). The control valve 82 is connected to an air supply (not shown in the drawings) by way of a conduit 84 (shown in FIG. 3) and a pressure regulator 86 (shown in FIG. 3) is interposed in the conduit 84 generally between the air supply (not shown in the drawings) and the control valve 82. The control valve 82 has two exhaust ports and one of the exhaust ports is connected to a conduit 88 (shown in FIG. 3) and the other exhaust port is connected to a conduit 90 (shown in FIG. 3). A forward rate control valve 92 (shown in FIG. 3) is interposed in the conduit 88 and a reverse rate control valve 94 (shown in FIG. 3) is interposed in the conduit 90.

The control valve 82 has an off position wherein the flow control valve 82 interupts fludic communication between the air supply (not shown in the drawings) and the pneumatic cylinder 70 and, in this condition, operating air is not supplied to the pneumatic cylinder 70. In addition, the control valve 82 has a forward position wherein the control valve 82 connects the air supply to the conduit 80 for conditioning the pneumatic cylinder 70 in the forward condition for moving the cylinder rod 72 in the forward direction 60. The control valve 82 also has a reverse position wherein the control valve 82 connects the air supply (not shown in the drawings) to the pneumatic cylinder 70 by way of the conduit 78 for moving the cylinder rod 74 in the reverse direction 62.

When the control valve 82 is positioned in the forward position wherein the air supply (not shown in the drawings) is connected to the conduit 80. The conduit 78 is connected to the forward rate control valve 92 in the conduit 88 for exhausting the forward end of the pneumatic cylinder 70 by way of the conduit 78 and the forward rate control valve 92. When the control valve 82 is positioned in the reverse position for connecting the air supply (not shown in the drawings) to the pneumatic cylinder 70 by way of the conduit 78, the conduit 80 is connected by way of the control valve 82 to the reverse rate control valve 94 in the conduit 90 for exhausting the rearward end of the numatic cylinder 70 by way of the conduit 80 and the reverse rate control valve 94. The forward and the reverse control valves 92 and 94 each are identical in construction and each are adapted to control the rate at which the air is exhausted from the respective forward or rearward ends of the pneumatic cylinder 70 for controlling the rate at which the cylinder rod 74 is moved in the forward or reverse directions 60 or 62.

Rate control valves which function and operate in the manner just described with respect to the forward and reverse rate control valves 92 and 94 are commercially available and one valve suitable for this application is available from the ARO Corporation of Bryan, Ohio, the ARO Model No. F02, for example. Control valves which are capable of functioning and operating in the manner described before with respect to the control valve 82 also are commercially available and one valve suitable for such an application is available from Wabco Fluid Power of Lexington, Ky., Wabco Model No. P59335, for example. Pressure regulators capable of functioning and operating in the manner described before with respect to the pressure regulator 86 also are commercially available and one pressure regulator suitable for such an application is available from the ARO Corporation of Bryan, Ohio, the ARO Model No. 129221-000, for example.

The air supply (not shown in the drawings) is connected to the drilling tool 64 by way of the conduit 68 and a control valve 96 (shown in FIG. 3) is interposed in the conduit 68. The control valve 96 is an on-off type of a valve and, in the "on" position, the control valve 96 operates to connect the air supply (not shown in the drawings) to the drilling tool 64 for conditioning the drilling tool 64 in the operating condition so the drilling tool 64 drivingly rotates the drill bit 66. In the "off" position of the control valve 96, operating air supply is interrupted between the air supply (not shown in the drawings) and the drilling tool 64 so the drilling tool 64 does not drivingly rotate the drill bit 66.

Figure 4:
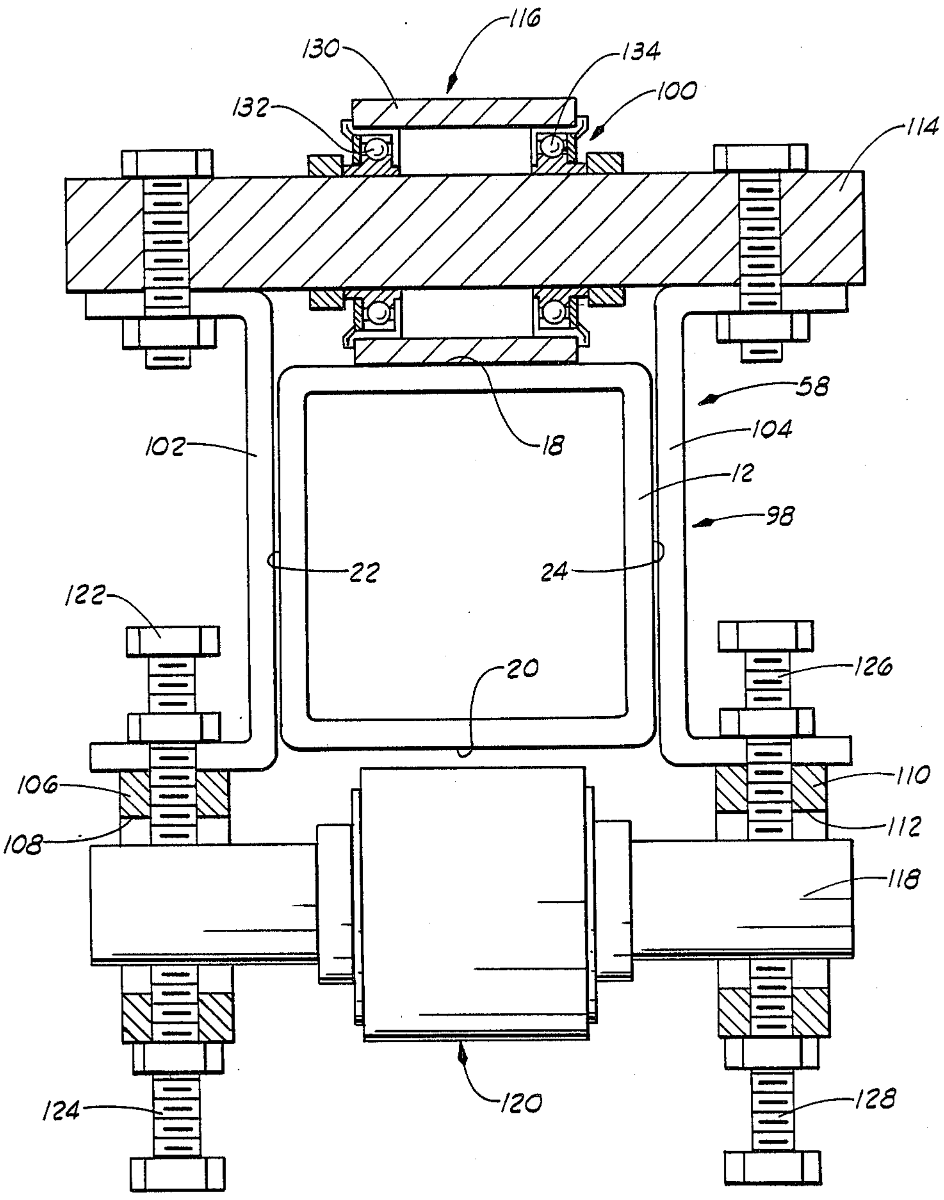
FIG. 4 is an end elevational view, partial sectional view showing the carriage frame and a typical roller assembly.

As shown more clearly in FIG. 4, the carriage 58 includes a carriage frame 98 and a pair of roller assemblies 100, the roller asemblies being designated in FIG. 2 by the reference numerals **100*a* and 100*b*. The roller asembly 100*a* is connected to one end of the carrige frame 98 and the roller assembly 100*b* is connected to the opposite end of the carriage frame 98. The roller assemblies 100*a* and 100*b* are identical in construction and a typical roller assembly 100 is shown in greater detail in FIG. 4. Each roller assembly 100*a* and 100*b* is connected to the carriage frame 98 and includes a portion which rollingly engages the guide bar 12. The roller assemblies 100 rollingly engage the guide bar 12 as the carriage frame 98 is moved in the forward and reverse directions 60 and 62 so that the carriage 58 and the drilling tool 64 and pneumatic cylinder 70 connected thereto are rollingly supported on the guide bar 12 for rolling movement in the forward and reverse directions 60 and 62**.

As shown more clearly in FIG. 4, the carriage frame 98 more particularly includes a first side wall 102 which extends generally along a portion of the first side 22 of the guide bar 12 with a portion of the first side wall 102 extending generally above the upper surface 18 and another portion of the first side wall 102 extending a distance generally below the lower surface 20. The carriage frame 98 also includes a second side wall 104 which extends generally along the second side 24 of the guide bar 12 with a portion of the second side wall 104 extending generally above the upper surface 18 and another portion of the second side wall 104 extending a distance generally below the lower surface 20.

As shown in FIG. 4, one end of a first support post 106 is connected to the first side wall 102, generally near the lower end of the first side wall 102 and the first support post 106 extends a distance generally below the lower end of the first side wall 102. A shaft opening 108 is formed through a portion of the first support post 106.

As shown in FIG. 4, a second support post 110 is connected to the lower end of the second side wall 104 and the second support post 110 extends a distance generally below the lower end of the second side wall 104. A shaft opening 112 is formed through a portion of the second support post 110 and the shaft opening 112 in the second support post 110 is generally aligned with the shaft opening 108 in the first support post 106.

As shown in FIG. 4, each roller assembly 100 includes a first roller shaft 114 having opposite ends. One end of the first roller shaft 114 is secured to the upper end of the first side wall 102 and the opposite end of the first roller shaft 114 is secured to the upper end of the second side wall 104, the first roller shaft extending generally over and a distance above the upper surface 18 of the guide bar 12. A first roller 116 is rollingly supported on the first roller shaft 114 and a portion of the first roller 116 rollingly engages the upper surface 18 of the guide bar 12 for cooperating to rollingly support the carriage 58 on the guide bar 12.

As shown in FIG. 4, each roller assembly 100 also includes a second roller shaft 118 having opposite ends. One end of the second roller shaft 118 extends through the shaft opening 108 in the first support post 106 and the opposite end of the second roller shaft 118 extends through the shaft opening 112 in the second support post 110, the second roller shaft 118 extending generally over and a distance generally below the lower surface 20 of the guide bar 12. A second roller 120 is rollingly supported on the second roller shaft 118 and the second roller 120 includes a portion which is rollingly engagable with the lower surface 20 of the guide bar 12 for cooperating to rollingly support the carriage 58 on the guide bar 12.

It should be noted that the shaft openings 108 and 112 each are larger than the diameter of the second roller shaft 118. An adjustment pin 122 extends through a portion of the first support post 106 and into the shaft opening 108 and another adjustment pin 124 extends through the first support post 106 and into the shaft opening 108, the adjustment pins 122 and 124 being generally aligned and disposed about a 180° apart.

The adjustment pins 122 and 124 each can be moved into and out of the shaft opening 108 and the adjustment pins 122 and 124 each engage a portion of the second roller shaft 118 for adjusting the position of the second roller shaft 118 in the shaft opening 112 of the second support post 110. An adjustment pin 126 extends through the second support post 110 and into the shaft opening 112 and another adjustment pin 128 extends through a portion of the second support post 110 and into the shaft opening 112. The adjustment pins 126 and 128 each are engagable with a portion of the second roller shaft 118 disposed in the shaft opening 112 for adjusting the position of the second roller shaft 118 in the shaft opening 112 of the second support post 110.

The adjustment pins 122, 124, 126 and 128 permit the position of the second roller shaft 118 in the shaft openings 108 and 112 to be adjusted to bring the second roller 120 into rolling engagement with the lower surface 120 of the guide bar 12, the second roller 120 being shown in FIG. 4 spaced a distance from the lower surface 20 of the guide bar 12 for illustration purposes only, since, in the operating position, the second roller 120 is adjusted to be in rolling engagement with the lower surface 120.

In operation, the doweling tool 10 is positioned generally near the edge of the concrete into which the dowel holes are to be formed with the second end 16 of the guide bar positioned generally above the upper surface of the concrete and beyond the edge into which the dowel holes are to be formed. In this position, the first end 14 of the guide bar 12 extends a distance from the edge of the concrete into which the dowel holes are to be formed and the first and the second channels 34 and 38 thus each are spaced a distance from the edge of the concrete into which the dowel holes are to be formed. In this position, the drill bit 66 of the drilling tool 64 generally faces the edge of the concrete into which the dowel holes are to be formed. With the doweling tool in this position, the positions of the first, second and third legs, 42, 44 and 54 are adjusted in the respective first, second and third channels, 34, 38 and 50 to bring the drill bit 66 into a position generally near the edge of the concrete and in a position generally across from the position in the edge of the concrete where the dowel hole is to be formed. The first, second and third legs, 42, 44 and 54 cooperate to hold the dowelling tool 10 stable in this position during the operation and forming of the dowel holes.

After the dowelling tool 10 has been positioned in the manner just described above, the control valve 96 is positioned in the open positioned to connect the air supply (not shown in the drawings) to the drilling tool 64 for supply operating air to the drilling tool 64, the drilling tool 64 operating to rotatingly drive the drill bit 66 in this condition. The control valve 82 is positioned in the forward position to connect the air supply (not shown in the drawings) to the rearward end of the pneumatic cylinder 70 by way of the conduit 80 and to connect the forward end of the pneumatic cylinder 70 to exhaust through the conduit 78 and the forward rate control valve 92. In this condition, the pneumatic cylinder 70 operates to move the cylinder rod 74 in the forward directions 60. Since the cylinder rod 74 is connected to the carriage 58, the carriage 58 also is moved in the forward direction 60 thereby moving the drilling tool 64 in the forward direction 60 to bring the drill bit 66 into drilling engagement with the edge of the concrete to drillingly form the dowel hole in the edge of the concrete. After the dowel hole has been formed, the control valve 82 is positioned in the reverse position to connect the air supply (not shown in the drawings) to the pneumatic cylinder 70 by way of the conduit 78 and to exhaust the rearward end of the pneumatic cylinder 70 by way of the conduit 80 and the reverse rate control valve 94. In this condition, the cylinder rod 74 is moved in the reverse direction 62 and, since the cylinder rod 74 is connected to the carriage 58, the carriage 58 and the drilling tool 64 connected thereto are moved in the reverse direction 62 to remove or withdraw the drill bit 66 from the dowel hole.

It is significant to note that the drilling tool 64 and the pneumatic cylinder 70 each are operated by operating air supplied by an air supply (not shown in the drawings) as opposed to hydraulic type control and powering. Also, it is significant to note that the carriage 58 and the drilling tool 64 supported thereon are rollingly supported on the guide bar 12 by way of the roller assemblies 100 so that the carriage 58 is rollingly moved in the forward and reverse directions 60 and 62 during the operation of the doweling tool 10.

Changes may be made in the construction and operation of the various components and assemblies described herein without departing from the spirit and the scope of the invention as defined in the following claims.

What is claimed is:

1. A doweling tool for drilling a dowel hole in concrete to facilitate the insertion of dowels in such dowel hole comprising:

- a guide bar having a first end, a second end, an upper surface, a lower surface, a first side and a second side;
- a support frame connected to the guide bar for supporting the guide bar in an operating position;
- a carriage movingly connected to the guide bar for movement in a forward direction generally from the first end toward the second end of the guide bar and for movement in a reverse direction generally from the second end toward the first end of the guide bar, the carriage comprising:
  - a carriage frame; and
  - roller means connected to the carriage frame and having a portion rollingly engaging the guide bar as the carriage is moved in the forward and reverse directions for rollingly supporting the carriage frame on the guide bar;
- a pneumatically operated drilling tool being connected to the carriage and having a drill bit and being adapted to receive operating air, the drilling tool drivingly rotating the drill bit in an operating condition when receiving operating air for drilling the dowel hole in the concrete;
- a pneumatic cylinder having a cylinder base and a cylinder rod extending a distance from the cylinder base, the pneumatic cylinder being adapted to receive operating air and having a forward condition for receiving operating air and moving the cylinder rod in the forward direction generally outwardly from the cylinder base and having a reverse condition for receiving operating air and moving the cylinder rod in the reverse direction generally into the cylinder base, a portion of the pneumatic cylinder being connected to the support frame and another portion of the pneumatic cylinder being connected to the carriage, the pneumatic cylinder moving the carriage and the drilling tool connected thereto in the forward direction when the pneumatic cylinder is conditioned in the forward condition for drillingly forming the dowel hole in the concrete in the operating condition of the drilling tool and the pneumatic cylinder moving the carriage and the drilling tool connected thereto in the reverse direction when the pneumatic cylinder is conditioned in the reverse condition for pulling the drill bit out of the dowel hole.

2. The doweling tool of claim 1 wherein the pneumatic cylinder is defined further as having the cylinder base connected to the support frame and the cylinder rod connected to the carriage.

3. The doweling tool of claim 1 wherein the carriage frame is defined further to include:

- a first side wall having an upper end and a lower end extending generally along a portion of the first side of the guide bar; and
- a second side wall having an upper end and a lower end extending generally along a portion of the second side of the guide bar; and wherein the roller means is defined further to include at least one roller assembly and wherein each roller assembly includes:
- a first roller shaft having one end connected to the first side wall generally near the upper end of the first side wall and an opposite end connected to the second side wall generally near the upper end of the second side wall, the first roller shaft extending a distance generally above and generally across the upper surface of the guide bar; and
- a first roller rollingly supported on the first roller shaft having a portion rollingly engaging the upper surface of the guide bar for cooperating to rollingly support the carriage on the guide bar.

4. The doweling tool of claim 3 wherein each roller assembly is defined further to include:

- a second roller shaft having one end connected to the first side wall generally near the lower end of the first side wall and an opposite end connected to the second side wall generally near the lower end of the second side wall, the second roller shaft extending a distance generally below and generally across the lower surface of the guide bar; and
- a second roller rollingly supported on the second roller shaft having a portion rollingly engaging the lower surface of the guide bar for cooperating to rollingly support the carriage on the guide bar.

5. The doweling tool of claim 4 wherein the first and the second rollers each comprise:

- a cylindrically shaped roller body having opposite ends and an opening extending therethrough intersecting the opposite ends thereof;
- a first bearing connected to the roller body generally near one end of the roller body and bearingly connected to the first roller shaft for rotatingly supporting the roller body on the first roller shaft; and
- a second bearing connected to the roller body generally near the opposite end of the roller body and bearingly connected to the first roller shaft for rollingly supporting the roller body on the roller shaft.

6. The doweling tool of claim 4 wherein the carriage frame is defined further to include:

- a first support post connected to the lower end of the first side wall and extending a distance therefrom and having a shaft opening formed therethrough;
- a second support post connected to the lower end of the second side wall and extending a distance therefrom and having a shaft opening formed therethrough, the shaft opening in the second support post being generally aligned with the shaft opening in the first support post and one end of the second roller shaft being disposed in the shaft opening in the first support post and the opposite end of the second roller shaft being disposed generally within the shaft opening in the first support post, the shaft opening in the first support post and the shaft opening in the second support post each being larger than the diameter of the second roller shaft; and means for adjustably positioning the second roller shaft in the shaft openings in the first and the second support shafts for positioning the second roller in rolling engagement with the lower surface of the guide bar.

7. The doweling tool of claim 1 wherein the carriage frame is defined further to include:

a first side wall having an upper end and a lower end extending generally along a portion of the first side of the guide bar; and a second side wall having an upper end and a lower end extending generally along a portion of a second side of the guide bar; and wherein the roller means is defined further to include one roller assembly disposed generally near one end of the carriage frame and another roller assembly disposed generally near the opposite end of the carriage frame and wherein each roller assembly is defined further to include:

a first roller shaft having one end connected to a first side wall generally near the upper end of the first side wall and an opposite end connected to the end of the second side wall generally near the upper end of the second side wall, the first roller shaft extending a distance generally above and generally across the upper surface of the guide bar; and a first roller rollingly supported on the first roller shaft having a portion rollingly engaging the upper surface of the guide bar for cooperating to rollingly support the carriage on the guide bar.

8. The doweling tool of claim 7 wherein each roller assembly is further defined to include:

a second roller shaft having one end connected to the first side wall generally near the lower end of the first side wall and an opposite end connected to the second side wall generally near the lower end of the second side wall, the second roller shaft extending a distance generally below and generally across the lower surface of the guide bar; and a second roller rollingly supported on the second roller shaft having a portion rollingly engaging the lower surface of the guide bar for cooperating to rollingly support the carriage on the guide bar.

9. The doweling tool of claim 8 wherein the first and second rollers each comprise:

a cylindrically shaped roller body having opposite ends and an opening extending therethrough intersecting the opposite ends thereof;

a first bearing connected to the roller body generally near one end of the roller body and bearingly connected to the first roller shaft for rotatingly supporting the roller body on the first roller shaft; and a second bearing connected to the roller body generally near the opposite end of the roller body and bearingly connected to the first roller shaft for rollingly supporting the roller body on the roller shaft.

10. The doweling tool of claim 8 wherein the carriage frame is further defined to include:

a first support post connected to the lower end of the first side wall and extending a distance therefrom and having a shaft opening formed therethrough;

a second support post connected to the lower end of the second side wall and extending a distance therefrom and having a shaft opening formed therethrough, the shaft opening in the second support post being generally aligned with the shaft opening in the first support post and one end of the second roller shaft being disposed in the shaft opening in the first support post and the opposite end of the second roller shaft being disposed generally within the shaft opening in the first support post, the shaft opening in the first support post and the shaft opening in the second support post each being larger than the diameter of the second roller shaft; and means for adjustably positioning the second roller shaft in the shaft openings in the first and the second support shafts for positioning the second roller in rolling engagement with the lower surface of the guide bar.

* * * * *